(12) United States Patent
Chigira et al.

(10) Patent No.: US 6,515,638 B2
(45) Date of Patent: *Feb. 4, 2003

(54) IMAGE DISPLAY APPARATUS

(75) Inventors: Tatsuo Chigira, Yokohama (JP);
Toshiki Ishino, Hiratsuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 29 days.

(21) Appl. No.: 09/334,591

(22) Filed: Jun. 17, 1999

(65) Prior Publication Data
US 2002/0036597 A1 Mar. 28, 2002

(30) Foreign Application Priority Data

Jun. 19, 1998 (JP) .......................... 10-221158
Jun. 19, 1998 (JP) .......................... 10-221159
Jun. 19, 1998 (JP) .......................... 10-221160

(51) Int. Cl.$^7$ ................................................ G09G 5/00
(52) U.S. Cl. .................................... 345/7; 345/8
(58) Field of Search ................ 345/7, 8, 9; 359/630, 359/631

(56) References Cited

U.S. PATENT DOCUMENTS

| | | | | |
|---|---|---|---|---|
| 5,291,184 A | * | 3/1994 | Iino | 345/7 |
| 5,491,491 A | * | 2/1996 | Lebby et al. | 345/7 |
| 5,703,605 A | * | 12/1997 | Takahashi | 345/8 |
| 5,995,291 A | * | 11/1999 | Togino | 345/8 |
| 6,018,423 A | * | 1/2000 | Takahashi | 345/8 |
| 6,023,253 A | * | 2/2000 | Taniguchi et al. | 345/7 |
| 6,150,998 A | * | 11/2000 | Travers et al. | 345/8 |

FOREIGN PATENT DOCUMENTS

| | | |
|---|---|---|
| JP | 7-104209 | 4/1995 |
| JP | 7-235892 | 9/1995 |
| JP | 8-251510 | 9/1996 |
| JP | 8-327920 | 12/1996 |

* cited by examiner

*Primary Examiner*—Xiao Wu
(74) *Attorney, Agent, or Firm*—Fitzpatrick, Cella, Harper & Scinto

(57) ABSTRACT

An image display apparatus includes a display element for displaying a video image, a backlight source for illuminating the display element, and a sculptured surface prism for guiding light from the display element. The sculptured surface prism enlarges the video image on the display element and presents the video image to an observer. The display element and the sculptured surface prism are supported by a holding member. An electrical circuit board is provided to drive the display element. The electrical circuit board and the display element are electrically connected. The electrical circuit board is arranged behind the display element, behind the sculptured surface prism when viewed from the observer, or on one side of the sculptured surface prism when viewed by the observer.

53 Claims, 8 Drawing Sheets

IMAGE DISPLAY APPARATUS

BACKGROUND OF THE INVENTION

1. Field of the Invention

The present invention relates to an image display apparatus such as a head mounted display which is mounted on the head to see a video image.

2. Related Background Art

Recently, image display apparatuses called head mounted displays (HMDS) which are mounted on the heads to see video images projected on display units are used for the purpose of seeing video images or screens of personal computers.

An HMD realizes appreciation of videos and the like anywhere without any influence on ambience. However, since it is mounted on the head, a demand has arisen for a lightweight apparatus with light fitting properties or a portable apparatus easy to detach. In addition, a portable facsimile image display apparatus which aims at seeing a facsimile image, or a portable image display apparatus such as a portable video phone has also been proposed.

As an HMD, an apparatus using a half mirror and concave mirror as an optical system and an LCD panel or a transmission liquid crystal display as a display element, which illuminates the LCD panel with backlight to see an image on the LCD panel is disclosed in Japanese Laid-Open Patent Application No. 8-251510. The present applicant has also proposed an optical system suitable for an HMD in Japanese Laid-Open Patent Application No. 7-104209.

As a portable image display apparatus, a transceiver having a small virtual image display is disclosed in Japanese Laid-Open Patent Application No. 7-235892. A display element and optical system suitable for this apparatus are disclosed in Japanese Laid-Open Patent Application No. 8-327920.

However, since the HMD disclosed in Japanese Laid-Open Patent Application No. 8-251510 uses a half mirror and concave mirror as an optical system, the optical system is large in the back-and-forth direction with respect to the line of sight. In addition, since the electrical circuit is arranged above the optical system, the dimension also becomes larger in the vertical direction to result in poor portability. This degrades the portability and makes it difficult to carry the apparatus in a pocket. Furthermore, since a half mirror is used, no bright screen display is possible.

In Japanese Laid-Open Patent Application No. 7-104209, an apparatus uses a sculptured surface prism to reduce the dimensions of the optical system and obtain light fitting properties. However, much improvement is required to carry the apparatus in a pocket or for portable use as an HMD.

In the portable image display apparatus disclosed in Japanese Laid-Open Patent Application No. 8-327920, since the optical system is formed by overlapping lenses in the direction of line of sight, and the electrical circuit board is arranged in the direction parallel to line of sight, the dimension in the back-and-forth direction becomes large.

SUMMARY OF THE INVENTION

It is an object of the present invention to provide an image display apparatus which solves the above-described problems and realizes small dimensions and excellent portability.

Other objects, features, and advantages of the present invention will become apparent from the following description of preferred embodiments in conjunction with the accompanying drawings.

DETAILED DESCRIPTION OF THE PREFERRED EMBODIMENTS

Embodiments of the present invention will be described below with reference to the accompanying drawings.

Figure 1:
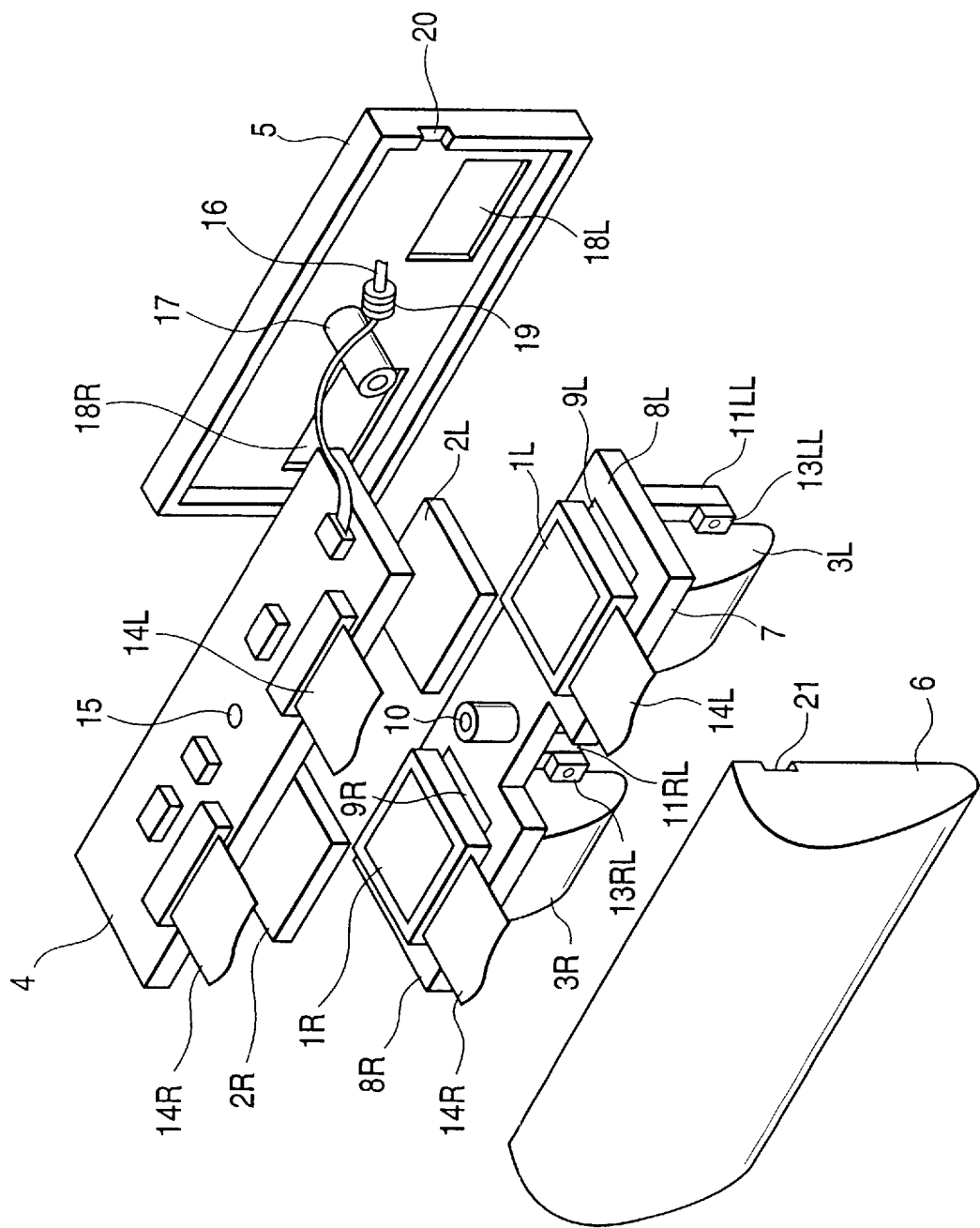
FIG. 1 is a perspective view showing the first embodiment.
Figure 2:
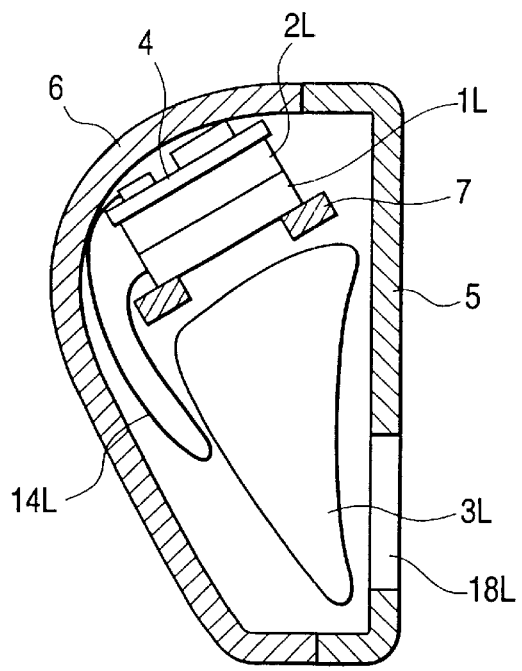
FIG. 2 is a sectional view showing the main part.

FIG. 1 is a perspective view showing an image display apparatus according to the first embodiment. FIG. 2 is a sectional view. This image display apparatus mainly comprises transmission LCD panels 1L and 1R for displaying video images for the left and right eyes of a user, respectively, flat tube-type fluorescent backlight units 2L and 2R for illuminating the LCD panels 1L and 1R, respectively, sculptured surface prisms 3L and 3R for enlarging video images on the LCD panels 1L and 1R and projecting them onto the left and right eyes, respectively, and an electrical circuit board 4 for controlling the system. These members are compactly accommodated in cover members, i.e., a base cover 5 and lid cover 6 of, e.g., an ABS resin.

The LCD panels 1L and 1R and sculptured surface prisms 3L and 3R are supported by a holding member 7 formed from, e.g., a polycarbonate resin. The holding member 7 has attachment surfaces 8L and 8R for attaching the LCD panels 1L and 1R for left and right eyes. The attachment surfaces 8L and 8R have openings 9L and 9R, respectively. A board attachment boss 10 projects upward between the attachment surfaces 8L and 8R.

The LCD panels 1L and 1R are positioned such that predetermined relationships hold between the LCD panels 1L and 1R and sculptured surface prisms 3L and 3R, respectively, the display portions are positioned in the ranges of the openings 9L and 9R of the holding member 7, and the user can obtain a natural view in observation, and fixed on the attachment surfaces 8L and 8R of the holding member 7 by bonding or screwing.

A total of four attachment flanges 11LL and 11LR, and 11RL and 11RR (attachment flanges 11LR and 11RR are not shown) are vertically formed at the two ends of the openings 9L and 9R on the lower side of the attachment surfaces 8L and 8R, respectively. A rib vertically formed between the attachment flanges 11LR and 11RL has an attachment hole 12 (not shown).

The sculptured surface prisms 3L and 3R are formed from, e.g., an acrylic resin and have optical characteristics as disclosed in Japanese Laid-Open Patent Application No. 7-104209. A total of four attachment flanges 13LL and 13LR, and 13RL and 13RR (attachment flanges 13LR and 13RR are not shown) are formed integrally with the side surfaces of the sculptured surface prisms 3L and 3R, respectively. The sculptured surface prisms 3L and 3R are positioned and fixed to the holding member 107 by bonding or screwing while making the attachment flanges 13LL, 13LR, 13RL, and 13RR correspond to the attachment flanges 11LL, 11LR, 11RL, and 11RR of the holding member 7, respectively.

The backlight units 2L and 2R are fixed on the LCD panels 1L and 1R, respectively, via a spacer or the like by a known means such as bonding. The electrical circuit board 4 having a drive circuit is mounted on the backlight units 2L and 2R. The backlight units 2L and 2R are electrically connected to electrode patterns on the electrical circuit board by soldering.

Electrodes for driving the backlight units 2L and 2R are connected to the electrical circuit board 4 through flexible flat cables 14L and 14R, respectively. The flexible flat cables 14L and 14R are bent, e.g., once with a margin such that the LCD panels 1L and 1R can be moved in positioning them.

The electrical circuit board 4 is formed from, e.g., a multilayered glass epoxy board and has an attachment hole 15 at substantially the central portion. The electrical circuit board 4 is fixed to the board attachment boss 10 of the holding member 7 through the attachment hole 15 by a screw. Circuits for displaying video images on the LCD panels 1L and 1R, inverter circuits for turning on the backlight units 2L and 2R, and power supply circuit are formed on the electrical circuit board 4. These circuits are connected to a video signal generation means such as a video deck including a video output circuit, signal processing circuit, and power supply circuit through an electrical wire 16 and a connector. The intermediate layer of the electrical circuit board 4 is partially grounded as a shield layer, so a high voltage generated in the inverter circuits is prevented from adversely affecting the video processing circuit as noise.

An attachment boss 17 projects at the center of the base cover 5 as a cover member. Openings 18L and 18R for left and right eyes are formed on the left and right sides of the attachment boss 17. The attachment boss 17 has a screw hole at the center. The holding member 7 is fixed to the base cover 5 by screwing the base cover 5 through the attachment hole 12 of the holding member 7. A damping member such as a rubber bush is inserted between the attachment hole 12 of the holding member 7 and the attachment boss 17 of the base cover 5, so that the holding member 7 is prevented from being deformed by an external force applied to the base cover 5 to impede a natural view.

The base cover 5 and lid cover 6 are fixed by bonding or screwing while a bush 19 attached to the electrical wire 16 is sandwiched between a notch 20 of the base cover 5 and a notch 21 of the lid cover 6 to mechanically fix the electrical wire 16.

The user mounts the image display apparatus with this arrangement on the head and looks in through the openings 18L and 18R of the base cover 5. Video signals from the video output device are output to the LCD panels 1L and 1R. Video images on the LCD panels 1L and 1R illuminated with the backlight units 2L and 2R are enlarged through the sculptured surface prisms 3L and 3R and observed by the user.

Since the image display apparatus of this embodiment has an efficient component arrangement: for example, the electrical circuit board 4 is positioned behind the LCD panels 1L and 1R, as shown in FIG. 2. Hence, the apparatus can be made compact. In assembly, the flexible flat cables 14L and 14R have slack and are bent at least once. For this reason, even when the LCD panels 1L and 1R move in positioning, the holding member 7 can be prevented from being applied with a force and deformed, and the LCD panels 1L and 1R can be prevented from shifting to adversely affect the video image. Since the electrical circuit board 4 is fixed to the holding member 7 at only substantially the central portion, the holding member 7 can be prevented from deforming due to the shape and, more particularly, the flatness of the electrical circuit board 4, so the user can obtain a natural view.

In this embodiment, the inverter circuits for turning on the fluorescent backlight units 2L and 2R are also formed on the electrical circuit board 4. When noise poses a problem, the inverter circuits are preferably formed on another board and arranged behind the backlight units.

Figure 3:
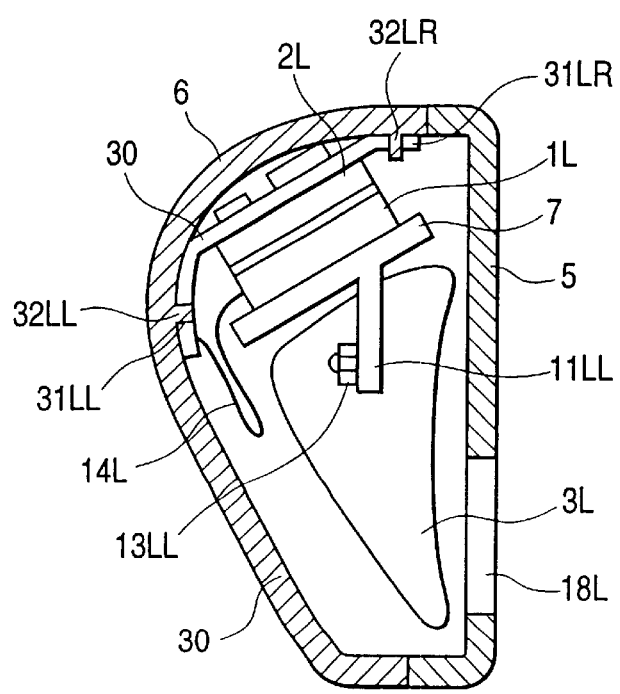
FIG. 3 is a sectional view showing the second embodiment.

FIG. 3 is a sectional view showing the arrangement of the second embodiment. The electrical circuit board of the first embodiment is a hard plate such as a glass epoxy board. In the second embodiment, the electrical circuit board is formed from a flexible printed board and positioned and fixed to a cover member, thereby making the entire apparatus more compact. The basic arrangement is almost the same as in the first embodiment. The same reference numerals as in the first embodiment denote the same parts in the second embodiment.

An electrical circuit board 30 is formed from a flexible printed board using, e.g., a polyimide resin as a base, and electrically connected to LCD panels 1L and 1R through flexible flat cables 14L and 14R integrated with the LCD panels 1L and 1R. Backlight units 2L and. 2R are connected and fixed to the electrical circuit board 30 at positions opposing the LCD panels 1L and 1R by soldering. On the flat portion of the electrical circuit board 30, circuits connected to a video signal generation means through an electrical wire 16 to display signals from the video signal generation means on the LCD panels 1L and 1R, inverter circuits for turning on the backlight units, and power supply circuit are formed, as in the first embodiment.

The electrical circuit board 30 has four attachment holes 31LL, 31LR, 31RL, and 31RR (attachment holes 31RL and 31RR are not shown). A lid cover 6 as a cover member has, on its inner surface, four attachment dowels 32LL, 32LR, 32RL, and 32RR (attachment dowels 32RL and 32RR are not shown) for positioning and fixing the electrical circuit board 30. In assembling the apparatus, the attachment dowels 32LL, 32LR, 32RL, and 32RR are fitted in the attachment holes 31LL, 31LR, 31RL, and 31RR of the electrical circuit board 30, respectively, and the electrical circuit board 30 is fixed to the lid cover 6 by screwing or the like.

Since the interval between the attachment dowels 32LL, 32LR, 32RL, and 32RR having directional components perpendicular to the viewing surface is made smaller than that between the attachment holes 31LL, 31LR, 31RL, and 31RR of the electrical circuit board 30 by a predetermined amount, the electrical circuit board 30 is fixed to the lid cover 6 by the elasticity of the electrical circuit board 30 formed from a flexible flat cable.

With this arrangement, the user mounts the image display apparatus on the head and looks in through openings 18L and 18R of a base cover 5. Video signals from the video output device are output to the LCD panels 1L and 1R. The video images on the LCD panels 1L and 1R illuminated with the backlight units 2L and 2R are enlarged through sculptured surface prisms 3L and 3R and observed by the user.

Since the electrical circuit board 30 in the image display apparatus is set along the inner wall of the lid cover 6 in assembling, the apparatus can be made compact. In addition, since the electrical circuit board 30 is formed from a flexible flat cable, it can be folded to concentrate circuit components of integrated circuits in the space between the LCD panels 1L and 1R and between the backlight units 2L and 2R for left and right eyes. Hence, the apparatus can be made more compact.

The image display apparatus of this embodiment has no mount portion, and the user holds the image display apparatus with a hand and looks in through the openings 18L and 18R of the base cover 5. However, when the mount mechanism of an HMD is attached to the base cover 5, the image.display apparatus can also be used as an HMD.

Figure 4:
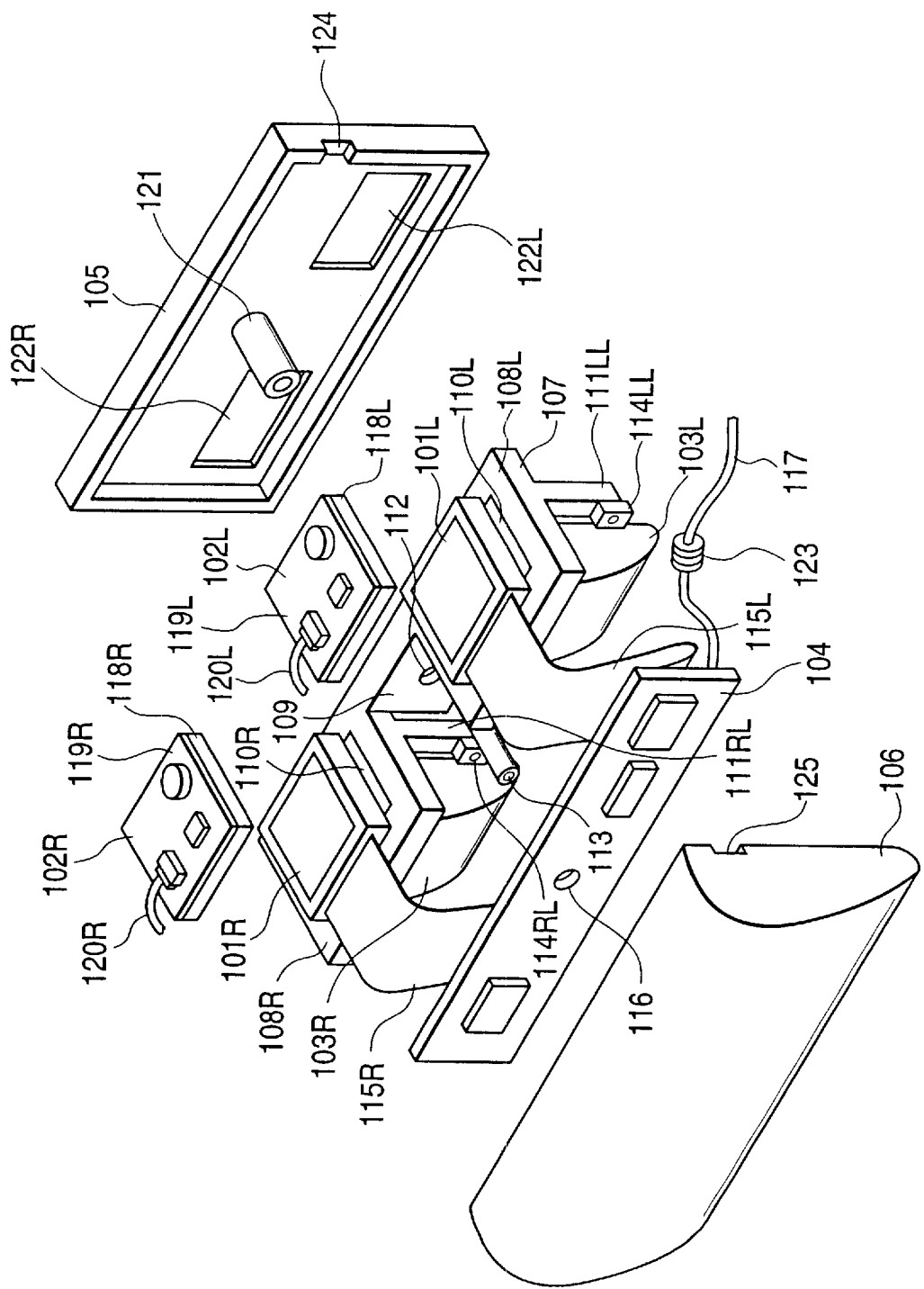
FIG. 4 is a perspective view showing the third embodiment.
Figure 5:
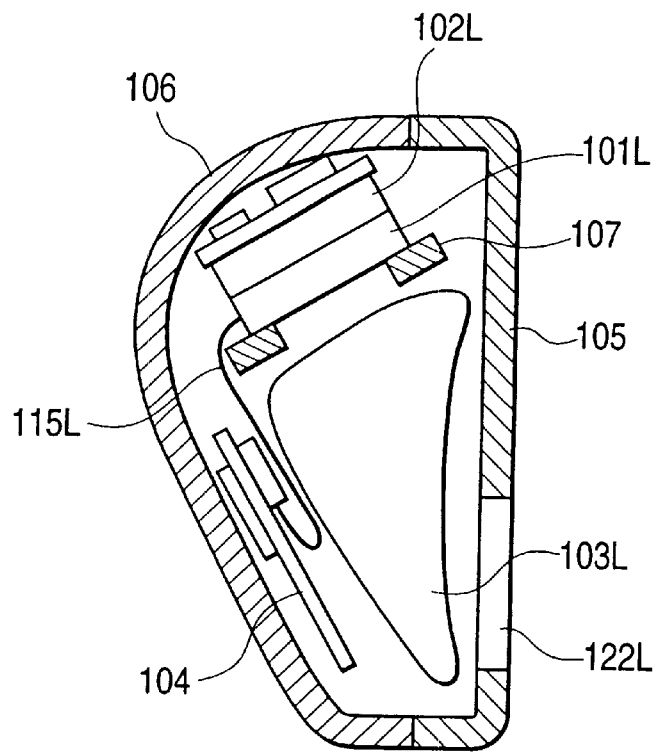
FIG. 5 is a sectional view of the main part.

FIG. 4 is a perspective view showing an image display apparatus according to the third embodiment. FIG. 5 is a sectional view. This will be described below although the description is partially the same as in the above embodiments. This image display apparatus mainly comprises transmission LCD panels 101L and 101R for displaying video images for the left and right eyes of a user, respectively, backlight units 102L and 102R for illuminating the LCD panels 1L and 1R, respectively, sculptured surface prisms 103L and 103R for enlarging video images on the LCD panels 101L and 101R and projecting them onto the left and right eyes, respectively, and an electrical circuit board 104 for controlling the system. These members are compactly accommodated in cover members, i.e., a base cover 5 and lid cover 6 of, e.g., an ABS resin.

The LCD panels 101L and 101R and sculptured surface prisms 103L and 103R are supported by a holding member 107 formed from, e.g., a polycarbonate resin. For the holding member 107, attachment surfaces 108L and 108R for attaching the LCD panels 101L and 101R for left and right eyes are coupled by a vertical surface 109. The attachment surfaces 108L and 108R have openings 10L and 110R at their central portions, respectively.

The LCD panels 101L and 101R are positioned such that predetermined relationships hold between the LCD panels 101L and 101R and sculptured surface prisms 103L and 103R, respectively, the display portions are positioned in the ranges of the openings 110L and 110R of the holding member 107, so that the user can obtain a natural view in observation, and the display portions are fixed on the attachment surfaces 108L and 108R of the holding member 107 by bonding or screwing.

A total of four attachment flanges 111LL and 111LR, and 111RL and 111RR (attachment flanges 111LR and 111RR are not shown) are vertically formed at two ends of the openings 110L and 110R on the lower side of the attachment surfaces 108L and 108R, respectively. The vertical surface 109 has an attachment hole 112 and attachment boss 113 at the upper and lower portions, respectively.

The sculptured surface prisms 103L and 103R are formed from e.g., an acrylic resin and have optical characteristics as disclosed in Japanese Laid-Open Patent Application No. 7-104209. A total of four attachment flanges 114LL and 114LR, and 114RL and 114RR (attachment flanges 114LR and 114RR are not shown) are formed integrally with the side surfaces of the sculptured surface prisms 103L and 103R, respectively. The sculptured surface prisms 103L and 103R are positioned and fixed to the holding member 107 by bonding or screwing while making the attachment flanges 114LL, 114LR, 114RL, and 114RR correspond to the attachment flanges 111LL, 111LR, 111RL, and 111RR of the holding member 107, respectively.

Electrodes for driving the LCD panels 101L and 101R are connected to the electrical circuit board 104 with drive circuits through flexible flat cables 115L and 115R, respectively. Each of the flexible flat cables 115L and 115R has, e.g., an S shape bent twice such that the LCD panels 101L and 101R can be moved in positioning them.

The electrical circuit board 104 is formed from, e.g., a glass epoxy board and has an attachment hole 116 at substantially the central portion. The electrical circuit board 104 is fixed to the attachment boss 113 of the holding member 107 through the attachment hole 116 by a screw. Circuits for displaying video images on the LCD panels 101L and 101R, inverter circuits for turning on the backlight units 102L and 102R, and power supply circuit are formed on the electrical circuit board 104. These circuits are connected to a video signal generation means such as a video deck including a video output circuit, signal processing circuit, and power supply circuit through an electrical wire 117 and a connector.

The backlight units 102L and 102R are formed from flat tube-type fluorescent backlight units 118L and 118R and inverter circuits 119L and 119R, respectively. The backlight units 102L and 102R are fixed on the LCD panels 101L and 101R via a spacer by a known means such as bonding and connected to the electrical circuits on the electrical circuit board 104 through electrical wires 120L and 120R, respectively.

The base cover 105 as a cover member has an attachment boss 121 at the center, and openings 122L and 122R for left and right eyes are formed on the left and right sides of the attachment boss 121. The attachment boss 121 has a screw hole at the center. The holding member 107 is fixed to the base cover 105 by screwing the base cover 105 through the attachment hole 112 of the holding member 107. A damping member such as a rubber bush is inserted between the attachment hole 112 of the holding member 107 and the attachment boss 121 of the base cover 105, so that the holding member 107 is prevented from being deformed by an external force applied to the base cover 105 to impede a natural view. The base cover 105 and lid cover 106 are fixed by bonding or screwing while a bush 123 attached to the electrical wire 117 is sandwiched between a notch 124 of the base cover 105 and a notch 125 of the lid cover 106 to mechanically fix the electrical wire 117.

With this arrangement, video images corresponding to video signals from the video output device are displayed on the LCD panels 101L and 101R. The video images on the LCD panels 101L and 101R illuminated with the backlight units 118L and 118R are enlarged through sculptured surface prisms 103L and 103R and observed by the user through the openings 122L and 122R of the base cover 105.

Since the image display apparatus of this embodiment has an efficient component arrangement: for example, the electrical circuit board 104 is positioned behind the sculptured surface prisms 103L and 103R, as shown in FIG. 5. Hence, the apparatus can be made compact. In assembly, the flexible flat cables 115L and 115R have slack and are bent at least once. For this reason, even when the LCD panels 101L and 101R move in positioning, the holding member 107 can be prevented from being applied with a force and deformed, and the LCD panels 101L and 101R can be prevented from shifting to adversely affect the video image. Since the electrical circuit board 104 is fixed to the holding member 107 at only substantially the central portion, the holding member 107 can be prevented from deforming due to the accuracy of the shape and, more particularly, flatness of the electrical circuit board 104, so the user can obtain a natural view.

In the third embodiment, the inverter circuits 119L and 119R are constructed as the backlight units 102L and 102R together with the fluorescent backlight units 118L and 118R. However, the inverter circuits 119L and 119R may be formed on the electrical circuit board 104. In this case, to prevent noise, the electrical circuit board 104 and the LCD panels 101L and 101R are preferably connected by cables different from those for connecting the fluorescent backlight units 118L and 118R.

Figure 6:
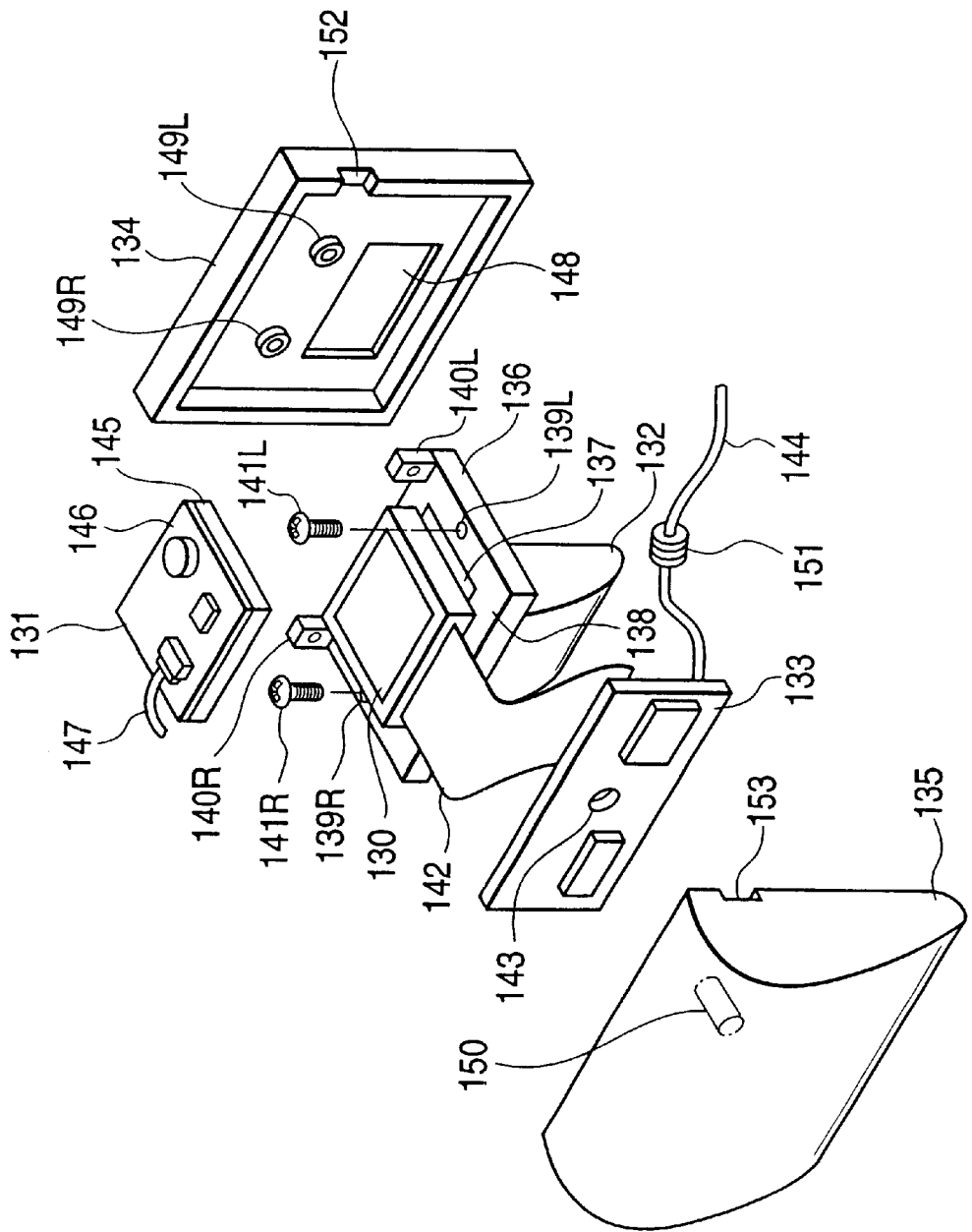
FIG. 6 is a perspective view showing the fourth embodiment.

FIG. 6 is a perspective view of an image display apparatus according to the fourth embodiment, which can be applied to a portable video phone or facsimile viewer. This image display apparatus mainly comprises a transmission LCD panel 130 for a single eye, backlight unit 131, and sculptured surface prism 132. These members are accommodated in cover members, i.e., a base cover 134 and lid cover 135 together with an electrical circuit board 133.

A holding member 136 of this embodiment is also formed from, e.g., a polycarbonate resin. The holding member 136 has an opening 137, LCD attachment surface 138, attachment holes 139L and 139R, and attachment flanges 140L and 140R. The sculptured surface prism 132 is the same as in the third embodiment and has left and right attachment screw holes in the surface opposing the LCD panel 130 outside the range where effective light passes through. When screws 141L and 141R are driven into the screw holes through the attachment holes 139L and 139R of the holding member 136, the sculptured surface prism 132 is fixed on the lower side of the holding member 136.

The LCD panel 130 is fixed on the LCD attachment surface 138 of the holding member 136 by bonding or screwing such that a predetermined relationship holds between the LCD panel 130 and sculptured surface prism 132, and the display portion is positioned within the range of the opening 137 of the holding member 136. An electrode for driving the LCD panel 130 is connected to the electrical circuit board 133 having an attachment hole 143, on which the drive circuit is formed, through a flexible flat cable 142.

The electrical circuit board 133 is connected to a video signal generation means through an electrical wire 144 and connector. The backlight unit 131 is formed from a fluorescent backlight unit 145 and inverter circuit 146. The backlight unit 131 is fixed to the LCD panel 130 via a spacer by a known means such as bonding, and also connected to the electrical circuit board 133 through an electrical wire 147.

The base cover 134 has an opening 148 and attachment bosses 149L and 149R. The attachment bosses 149L and 149R have screw holes at their centers. When screws are driven into the screw holes through the attachment flanges 140L and 140R of the holding member 136, the holding member 136 is fixed to the base cover 134.

The lid cover 135 has a board attachment boss 150. When the board attachment boss 150 is inserted into the attachment hole 143 of the electrical circuit board 133, and a screw is driven into the screw hole of the board attachment boss 150, the electrical circuit board 133 is fixed to the lid cover 135. The lid cover 135 is further fixed to the base cover 134 by a known means such as bonding or screwing. At this time, a bush 151 attached to the electrical wire 144 is sandwiched by notches 152 and 153 of the base cover 134 and lid cover 135.

With this arrangement, a video signal from the video output device is output to the LCD panel 130. The video image on the LCD panel 130 illuminated with the backlight unit 131 is enlarged through the sculptured surface prism 132 and observed by one eye of the user who is looking from the opening 148 of the base cover 134. As described above, when the electrical circuit board 133 is fixed to the top case 135, the holding member 136 can be prevented from being deformed in fixing the electrical circuit board 133.

Figure 7:
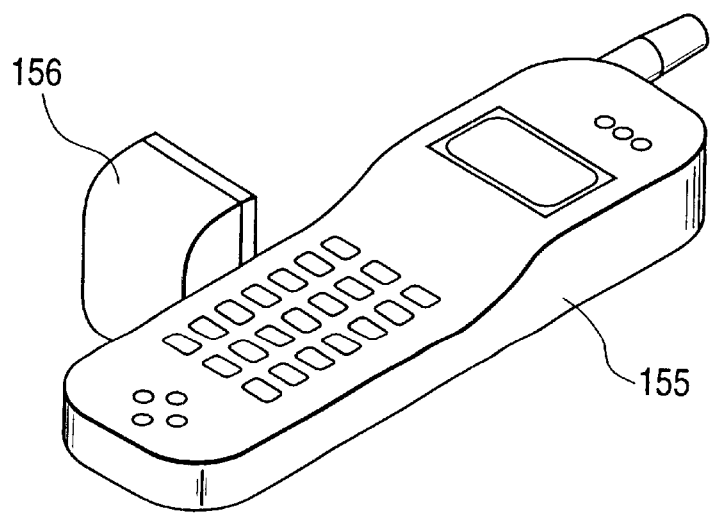
FIG. 7 is a perspective view showing a portable video phone of the fifth embodiment.

FIG. 7 shows the fifth embodiment in which a single-eye image display apparatus is applied to a portable video phone. A visual unit 156 for displaying an image is connected to a portable telephone main body 155. More specifically, the image display apparatus shown in FIG. 6 is electrically connected to the portable telephone main body 155 and mechanically fixed. In this case, to cope with the personal difference in head shape between users, the visual unit 156 is preferably fixed such that it can pivot with respect to the portable telephone main body 155 at least in the vertical direction of the screen.

Figure 8:
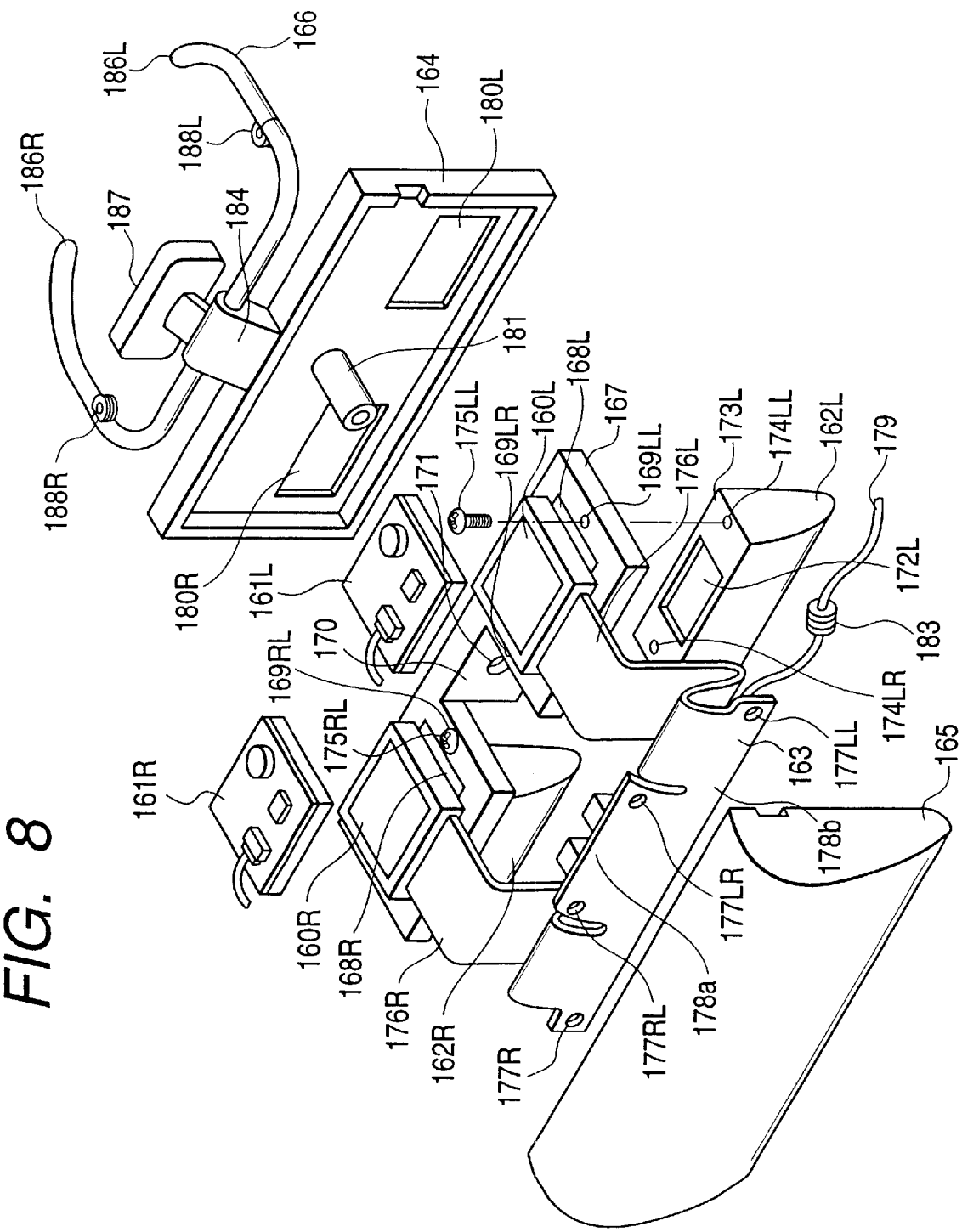
FIG. 8 is a perspective view showing the sixth embodiment.
Figure 9:
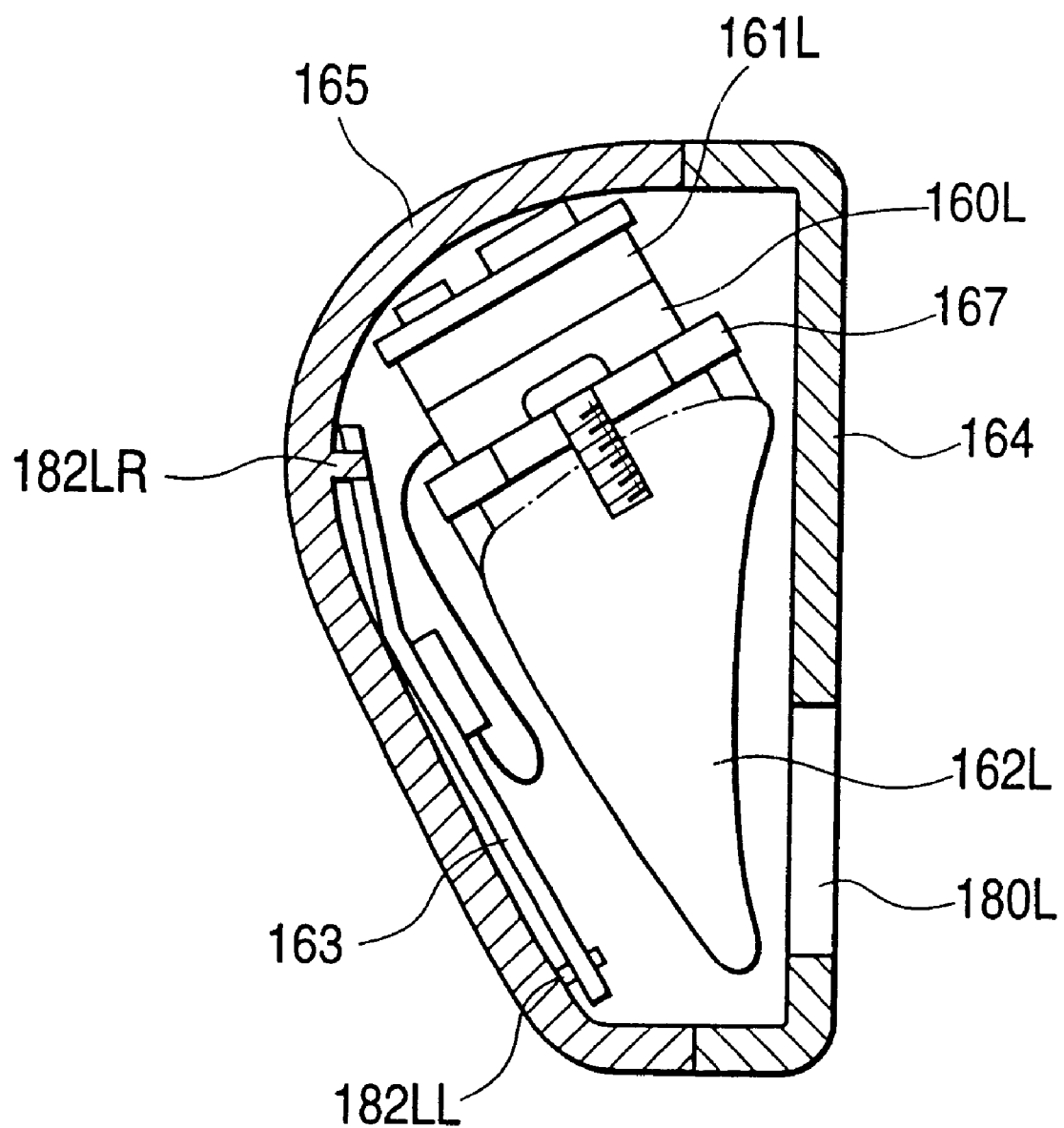
FIG. 9 is a perspective view showing the main part.

FIG. 8 is a perspective view showing the sixth embodiment. FIG. 9 is a sectional view. An electrical circuit board is formed not from a hard board but from a flexible printed board as part of a flexible flat cable to make the entire apparatus more compact, and this arrangement is applied to an HMD.

The image display apparatus of this embodiment comprises transmission LCD panels 160L and 160R for left and right eyes, backlight units 161L and 161R, and sculptured surface prisms 162L and 162R, as in the third embodiment. An electrical circuit board 163 is formed from the same material as that of a flexible flat cable, e.g., a polyimide resin, and integrated with the flexible flat cable. These members are compactly accommodated in cover members, i.e., a base cover 164 and lid cover 165, as in the third embodiment. The base cover 164 has an HMD mount portion 166 for mounting the HMD on the head of a user.

A holding member 167 of this embodiment is also formed from, e.g., a polycarbonate resin. The front surface of the holding member 167 corresponds to an attachment surface for attaching the LCDs for left and right eyes, and the rear surface corresponds to a flat prism attachment surface for attaching the prisms for left and right eyes. The holding member 167 has openings 168L and 168R for left and right eyes. Prism attachment holes 169LL and 169LR, and 169RL and 169RR are formed on the left and right sides of the openings 168L and 168R, respectively. An attachment hole 171 for fixing the holding member 167 to the base cover 164 is formed in a vertical surface 170 at the central portion.

The sculptured surface prisms 162L and 162R are formed from, e.g., an acrylic resin and have the same optical characteristics as those of the third embodiment. Attachment surfaces 173L and 173R are formed on surfaces of the sculptured surface prisms 162L and 162R opposing the LCD panels 160L and 160R so as to surround regions 172L and 172R where effective light passes through. The attachment surfaces 173L and 173R have attachment screw holes 174LL, 174LR, 174RL, and 174RR, respectively.

The attachment surfaces 173L and 173R of the sculptured surface prisms abut against the prism attachment surface of the holding member 167. When screws 175LL, 175LR, 175RL, and 175RR (screws 175RL and 175RR are not shown) are driven into the screw holes 174LL, 174LR, 174RL, and 174RR of the sculptured surface prisms 162L and 162R through the prism attachment holes 169LL, 169LR, 169RL, and 169RR, respectively, the sculptured surface prisms 162L and 162R are fixed to the holding member 167. The position of the prism attachment surface is adjusted such that when the attachment surfaces 173L and 173R of the sculptured surface prisms 162L and 162R abut against the prism attachment surface of the holding member 167, images on the LCD panels 160L and 160R can be seen as if they were separated from the user by, e.g., 2 m.

Also, for the sculptured surface prisms 162L and 162R and holding member 167, a plurality of, e.g., two positioning bosses are formed on the attachment surfaces 173L and 173R (attachment surface 173R is not shown) of the sculptured surface prisms 162L and 162R. Positioning holes corresponding to the bosses are formed in the prism attachment surface of the holding member 167. The bosses are fitted in the positioning holes to position the sculptured surface prisms 162L and 162R in a direction perpendicular to the visual axis and fixed.

The electrical circuit board 163 has expanded portions 176L and 176R functioning as flexible flat cables. Each of the expanded portions 176L and 176R has an S shape bent twice, as shown in FIG. 8, such that the LCD panels 160L and 160R can be moved in positioning them.

The electrical circuit board 163 has attachment holes 177LL, 177LR, 177RL, and 177RR. Circuits for displaying signals from a video signal generation means on the LCD panels 160L and 160R, circuits for turning on the backlight units, and power supply circuit are formed on flat portions 178a and 178b on the electrical circuit board 163. The electrical circuit board 163 is connected to the video signal generation means through an electrical wire 179.

The base cover 164 has openings 180L and 180R and attachment boss 181. The attachment boss 181 is inserted into the attachment hole 171 of the holding member 167 via a damping member such as a rubber bush is inserted, and a screw is driven into the screw hole formed at the center of the attachment boss 181, thereby fixing the holding member 167 to the base cover 164.

The lid cover 165 has four dowels 182LL, 182LR, 182RL, and 182RR (dowels 182RL and 182RR are not shown) for positioning and fixing the electrical circuit board 163. In assembling the apparatus, the dowels 182LL, 182LR, 182RL, and 182RR are fitted in the four attachment holes 177LL, 177LR, 177RL, and 177RR of the electrical circuit board 163, respectively, as shown in FIG. 9, to fix the electrical circuit board 163 to the lid cover 165.

When the interval between the dowels 182LL, 182LR, 182RL, and 182RR formed in the vertical direction with respect to the line of sight is made smaller than that between the corresponding holes on the electrical circuit board 163 by a predetermined amount, the electrical circuit board 163 can be fixed to the lid cover 165 by the elastic force generated in the electrical circuit board 163. The lid cover 165 is fixed to the lid cover 165 by a known means such as bonding or screwing. The electrical wire 179 is fixed while a bush 183 is sandwiched between the notch of the base cover 164 and notch of the lid cover 165.

The HMD mount portion 166 is attached to the base cover 164 via an HMD mount portion attachment portion 184. The HMD mount portion 166 comprises a front frame 185, left and right side frames 186L and 186R, front pad 187, and left and right hinges 188L and 188R. In the non-use state, the HMD mount portion 166 can be retracted by folding the left and right side frames 186L and 186R at the left and right hinges 188L and 188R.

With this arrangement, the user mounts the image display apparatus on the head using the front pad 187 and side frames 186L and 186R. Video signals are output from the video output device to the LCD panels 160L and 160R. Images on the LCD panels 160L and 160R illuminated with the backlight units 161L and 161R are enlarged through the sculptured surface prisms 162L and 162R and observed by the user through the openings 180L and 180R.

As described above, by fixing the sculptured surface prisms 162L and 162R to the holding member 167 and fixing the LCD panels 160L and 160R to the holding member 167, dust can be prevented from entering the LCD panels 160L and 160R or surfaces of the sculptured surface prisms 162L and 162R opposing the LCD panels 160L and 160R. When a high optical magnification is set, a gap between the attachment surfaces 173L and 173R of the sculptured surface prisms 162L and 162R and holding member 167, a gap between the LCD attachment surface 174 of the holding member 167 and LCD panels 160L and 160R, or a gap at a portion between the holding member 167 for fixing the LCD panels 160L and 160R and LCD panels 160L and 160R, which is not associated with display, is filled with a filler. In this case, small gaps formed depending on the surface states of components can be filled. For this reason, dust can be prevented from entering the gaps or being seen by the user when he/she looks at an image.

Since the electrical circuit board 163 shown in FIG. 9 is set along the inner wall of the lid cover 165 in assembling, the image display apparatus can be made compact. In addition, when the board and flat cables are laid out such that tall electrical components such as integrated circuits are positioned in the space between the sculptured surface prisms 162L and 162R, the apparatus can be made more compact.

Figure 10:
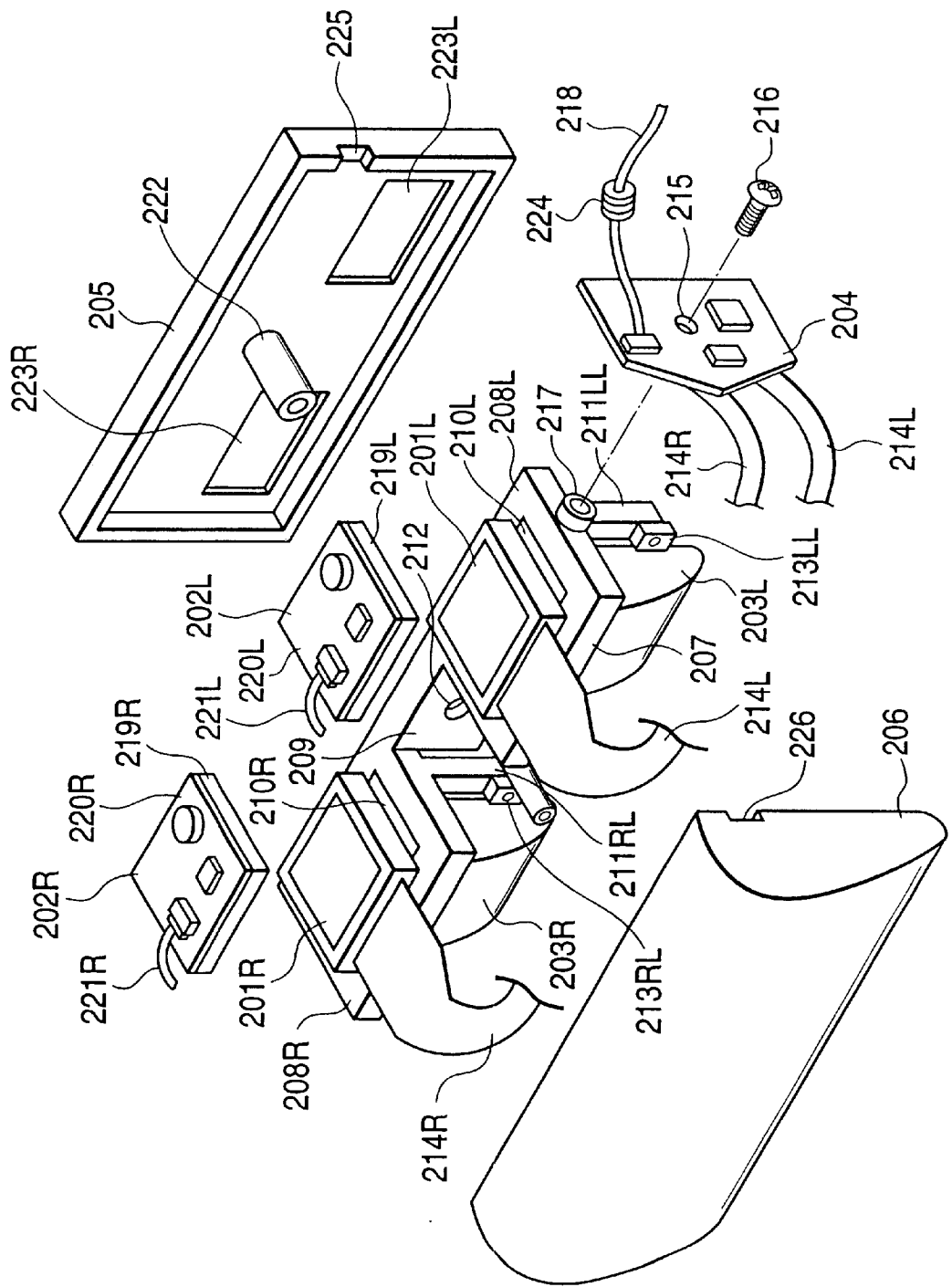
FIG. 10 is a perspective view showing the seventh embodiment.

FIG. 10 is a perspective view showing an image display apparatus according to the seventh embodiment. This image display apparatus mainly comprises transmission LCD panels 201L and 201R for displaying video images for the left and right eyes of a user, backlight units 202L and 202R for illuminating the LCD panels 201L and 201R, respectively, sculptured surface prisms 203L and 203R for enlarging video images on the LCD panels 201L and 201R and projecting them to left and right eyes, respectively, and an electrical circuit board 204 for controlling the system. These members are compactly accommodated in cover members, i.e., a base cover 205 and lid cover 206 formed from, e.g., an ABS resin.

The LCD panels 201L and 201R and sculptured surface prisms 203L and 203R are supported by a holding member 207 formed from, e.g., a polycarbonate resin. For the holding member 207, attachment surfaces 208L and 208R for attaching the LCD panels 201L and 201R for left and right eyes are coupled by a vertical surface 209. The attachment surfaces 208L and 208R have openings 210L and 210R at their central portions.

The LCD panels 201L and 201R are positioned such that predetermined relationships hold between the LCD panels 201L and 201R and sculptured surface prisms 203L and 203R, respectively, the display portions are positioned in the ranges of the openings 210L and 210R of the holding member 207, and the user can obtain a natural view in observation, and fixed on the attachment surfaces 208L and 208R of the holding member 207 by bonding or screwing.

A total of four attachment flanges 211LL and 211LR, and 211RL and 211RR (attachment flanges 211LR and 211RR are not shown) are vertically formed at two ends of the openings 210L and 210R on the lower side of the attachment surfaces 208L and 208R, respectively. The vertical surface 209 has an attachment hole 212.

The sculptured surface prisms 203L and 203R are formed from, e.g., an acrylic resin and has optical characteristics as disclosed in Japanese Laid-Open Patent Application No. 7-104209. A total of four attachment flanges 213LL and 213LR, and 213RL and 213RR (attachment flanges 213LR and 213RR are not shown) are formed integrally with the side surfaces of the sculptured surface prisms 203L and 203R, respectively. The sculptured surface prisms 203L and 203R are positioned and fixed to the holding member 207 by bonding or screwing while making the attachment flanges 213LL, 213LR, 213RL, and 213RR correspond to t he attachment flanges 211LL, 211LR, 211RL, and 211RR of the holding member 207, respectively.

Electrodes for driving the LCD panels 201L and 201R are connected to the electrical circuit board 204 with drive circuits through flexible flat cables 214L and 214R, respectively. Each of the flexible flat cables 214L and 214R is bent and connected to the electrical circuit board 204 fixed on one side of the holding member 207.

The electrical circuit board 204 is formed from, e.g., a glass epoxy board and has an attachment hole 215. The electrical circuit board 204 is fixed to an attachment boss 217 of the holding member 207 through the attachment hole 215 by a screw 216. Circuits for displaying video images on the LCD panels 201L and 201R, circuits for turning on the backlight units 202L and 202R, and power supply circuit are formed on the electrical circuit board 204. These circuits are connected to a video signal generation means such as a video deck including a video output circuit, signal processing circuit, and power supply circuit through an electrical wire 218 and a connector.

The backlight units 202L and 202R comprise flat tube-type fluorescent backlight units 219L and 219R and inverter circuits 220L and 220R, respectively. The backlight units 202L and 202R are fixed on the LCD panels 201L and 201R via a spacer by a known means such as bonding and connected to the electrical circuits on the electrical circuit board 204 through electrical wires 221L and 221R, respectively.

The base cover 205 as a cover member has an attachment boss 222 at the center, and openings 223L and 223R for left and right eyes are formed on the left and right sides of the attachment boss 222. The attachment boss 222 has a screw hole at the center. The holding member 207 is fixed to the base cover 205 by screwing the base cover 205 through the attachment hole 212 of the holding member 207. A damping member such as a rubber bush is inserted between the attachment hole 212 of the holding member 207 and the attachment boss 222 of the base cover 205, so that the holding member 207 is prevented from being deformed by an external force applied to the base cover 205 to impede a natural view. The base cover 205 and lid cover 206 are fixed by bonding or screwing while a bush 224 attached to the electrical wire 218 is sandwiched between a notch 225 of the base cover 205 and a notch 225 of the lid cover 206.

With this arrangement, video images corresponding to video signals from the video output device are displayed on the LCD panels 201L and 201R. The video images on the LCD panels 201L and 201R illuminated with the backlight units 219L and 219R are enlarged through sculptured surface prisms 203L and 203R and observed by the user through the openings 223L and 223R of the base cover 205.

Since the component arrangement is efficient: for example, the electrical circuit board 204 is positioned on one side of the sculptured surface prisms 203L and 203R. Hence, the apparatus can be made compact. In assembly, the LCD panels 201L and 201R and electrical circuit board 204 are separated by the flexible flat cables 214L and 214R. For this reason, even when the LCD panels 201L and 201R move in positioning, the holding member 207 can be prevented from being applied with a force and deformed, and the LCD panels 201L and 201R can be prevented from shifting to adversely affect the video image. Since the electrical circuit board 204 is fixed to the side surface of the holding member 207, the holding member 207 can be prevented from deforming due to the shape and, more particularly, flatness of the electrical circuit board 204, so the user can obtain a natural view.

In this embodiment, the inverter circuits 220L and 220R are constructed as the backlight units 202L and 202R together with the fluorescent backlight units 219L and 219R. However, the inverter circuits 220L and 220R may be formed on the electrical circuit board 204. In this case, to prevent noise, the electrical circuit board 204 and the LCD panels 201L and 201R are preferably connected by cables different from those for connecting the fluorescent backlight units 219L and 219R.

In addition, in this embodiment, one electrical circuit board 204 having circuits for displaying video images on the left and right LCD panels 201L and 201R is disposed on one side of the image display apparatus. However, two electrical circuit boards 204 may be arranged on the left and right sides, respectively. Especially, when the scale of the electrical circuit board 204 is large, this arrangement can be employed to improve the portability of the image display apparatus.

In the seventh embodiment, fitting properties as an HMD have not been mentioned. When a mount unit as disclosed in Japanese Patent Application No. 10-14972 by the present applicant is attached to the base cover 205, a compact apparatus as an HMD excellent in portability can be obtained.

In the image display apparatus of each of above embodiments, sculptured surface prisms are used as an optical system, an electrical circuit board is arranged on one side of the sculptured surface prisms, and the electrical circuit board and display elements are connected through flexible flat cables. With this arrangement, a compact apparatus excellent in portability can be realized.

When sculptured surface prisms for left and right eyes are used, an electrical circuit board is arranged on one side of the sculptured surface prisms, and the electrical circuit board and display elements for left and right eyes are connected through flexible flat cables, the visual axis can be prevented from shifting in the vertical direction due to bend of the flexible flat cables in assembling to adversely affect the optical condition. Hence, a safety, comfortable, and natural binocular can be realized.

What is claimed is:

1. An image display apparatus comprising:
   a display element displaying a video image;
   a light source illuminating said display element;
   a free-form surface prism guiding light of the video image from said display element, said free-form surface prism enlarging the video image on said display element and presenting the video image to an observer, said free-form surface prism having an incidence surface of which the light of the video image from said display element is incident, said incidence surface being tilted with respect to a visual axis toward the observer by a predetermined angle;
   a holding member supporting said display element and said free-form surface prism; and an electrical circuit board driving said display element, wherein said electrical circuit board and said display element are separated from each other but are electrically connected, and said electrical circuit board is arranged behind said display element, behind said free-form surface prism when viewed from the observer, or on at least one side of said free-form surface prism when viewed from the observer.

2. An apparatus according to claim 1, wherein said electrical circuit board and said display element are electrically connected through a flexible flat cable bent at least once.

3. An apparatus according to claim 1, wherein said electrical circuit board is fixed to said holding member at one portion.

4. An apparatus according to claim 1, wherein said apparatus further comprises a cover, and said electrical circuit board is fixed to said cover.

5. An apparatus according to claim 1, wherein said electrical circuit board is fixed to at least one side surface of said holding member.

6. An apparatus according to claim 1, wherein said apparatus is electrically connected and mechanically attached to a portable telephone main body.

7. An apparatus according to claim 1, wherein said light source is a backlight source which is fixed to a rear surface of said display element, and said electrical circuit board is set on a side of said backlight source opposite to said display element.

8. An apparatus according to claim 1, wherein said display element comprises a liquid crystal display element.

9. An apparatus according to claim 1, wherein said electrical circuit board comprises a flexible printed board.

10. An apparatus according to claim 1, wherein said electrical circuit board and said display element are electrically connected through a flexible flat cable, and a central position of said flexible flat cable on said electrical circuit board substantially matches a central position of said free-form surface prism.

11. An image display apparatus comprising:

two display elements displaying video images corresponding to left and right eyes, respectively;

two light sources illuminating said two display elements, respectively;

two free-form surface prisms guiding lights of the video images from said two display elements to the left and right eyes, respectively, said free-form surface prisms enlarging the video images on said two display elements and presenting the video images to an observer, said two free-form surface prisms having incidence surfaces on which the lights of the video images from the corresponding display elements are incident, each of said incidence surfaces being tilted with respect to a visual axis toward the observer by a predetermined angle;

a holding member supporting said two display elements and said two free-form surface prisms; and at least one electrical circuit board driving said two display elements, wherein said electrical circuit board and said display elements are separated from each other but are electrically connected, and said electrical circuit board is arranged behind said display elements, behind said free-form surface prisms when viewed from the observer, or on at least one side of said free-form surface prisms when viewed from the observer.

12. An apparatus according to claim 11, wherein said electrical circuit board and said display elements are electrically connected through flexible flat cables bent at least once.

13. An apparatus according to claim 11, wherein said electrical circuit board is fixed to said holding member at one portion.

14. An apparatus according to claim 11, wherein said apparatus further comprises a cover, and said electrical circuit board is fixed to said cover.

15. An apparatus according to claim 11, wherein said electrical circuit board comprises one electrical circuit board fixed to a side surface of said holding member.

16. An apparatus according to claim 11, wherein said electrical circuit board comprises two electrical circuit boards fixed to two side surfaces of said holding member, respectively.

17. An apparatus according to claim 11, wherein said light sources are backlight sources which are fixed to rear surfaces of said display elements, respectively, and said electrical circuit board is set on a side of said backlight sources opposite to said display elements.

18. An apparatus according to claim 11, wherein said display elements comprise liquid crystal display elements.

19. An apparatus according to claim 11, wherein said electrical circuit board comprises a flexible printed board.

20. An apparatus according to claim 11, wherein said electrical circuit board and said display elements are electrically connected through flexible flat cables, and a central position of said flexible flat cable on said electrical circuit board substantially matches a central position of said free-form surface prism.

21. An image display apparatus comprising:

a display element displaying a video image;

a light source illuminating said display element;

a free-form surface prism guiding light of the video image from said display element, said free-form surface prism enlarging the video image on said display element and presenting the video image to an observer, said free-form surface prism having an incidence surface on which the light of the video image from said display element is incident, said incidence surface being tilted with respect to a visual axis toward the observer by a predetermined angle;

a holding member supporting said display element and said free-form surface prism, said holding member supporting said display element substantially parallel to said tilted incidence surface of said free-form surface prism; and an electrical circuit board driving said display element, wherein said electrical circuit board and said display element are separated from each other but are electrically connected, and said electrical circuit board is arranged substantially parallel to said display element.

22. An apparatus according to claim 21, wherein said electrical circuit board and said display element are electrically connected through a flexible flat cable.

23. An apparatus according to claim 21, wherein said flexible flat cable is bent at least once.

24. An apparatus according to claim 21, wherein
said electrical circuit board is fixed to said holding member at one portion.

25. An apparatus according to claim 21, wherein
said apparatus further comprises a cover, and
said electrical circuit board is fixed to said cover.

26. An apparatus according to claim 21, wherein said light source is a backlight source.

27. An image display apparatus comprising:
two display elements displaying video images corresponding to left and right eyes, respectively:
two light sources illuminating said two display elements, respectively;
two free-form surface prisms guiding light of the video images from said two display elements to the left and right eyes, respectively, said free-form surface prisms enlarging the video images on said two display elements and presenting the video images to an observer, said two free-form surface prisms having incidence surfaces on which the lights of the video images from the corresponding display elements are incident, each of said incidence surfaces being tilted with respect to a visual axis toward the observer by a predetermined angle;
a holding member supporting said two display elements and said free-form surface prisms, said holding member supporting each of said display elements substantially parallel to said tilted incidence surface of said corresponding free-form surface prism; and
at least one electrical circuit board driving said two display elements,
wherein said electrical circuit board and said two display elements are separated from each other but are electrically connected, and said electrical circuit board is arranged substantially parallel to said display elements.

28. An apparatus according to claim 27, wherein
said electrical circuit board and said display elements are electrically connected through flexible flat cables.

29. An apparatus according to claim 27, wherein said two light sources are two backlight sources.

30. An image display apparatus comprising:
a display element displaying a video image;
a light source illuminating said display element;
a free-form surface prism guiding light of the video image from said display element, said free-form surface prism enlarging the video image on said display element and presenting the video image to an observer, said free-form surface prism having an incidence surface on which the light of the video image from said display element is incident, said incidence surface being tilted with respect to a visual axis toward the observer by a predetermined angle;
a holding member supporting said display element and said free-form surface prism, said holding member supporting said display element substantially parallel to said tilted incidence surface of said free-form surface prism;
an electrical circuit board driving said display element; and
a cover having a portion for observing the light of the video image from said free-form surface prism, said cover covering said display element, said light source, said free-form surface prism, said holding member and said electrical circuit board, wherein
said electrical circuit board and said display element are separated from each other but are electrically connected, and said electrical circuit board is disposed between said cover and said display element or between said cover and said free-form surface prism.

31. An apparatus according to claim 30, wherein said portion of said cover for observing the light of the video image is an opening.

32. An image display apparatus comprising:
two display elements displaying video images corresponding to left and right eyes, respectively;
two light sources illuminating said two display elements, respectively;
two free-form surface prisms guiding lights of the video images from said two display elements to the left and right eyes, respectively, said free-form surface prisms enlarging the video images on said two display elements and presenting the video images to an observer, said two free-form surface prisms having incidence surfaces on which the lights of video images from the corresponding display elements are incident, each of said incidence surfaces being tilted with respect to a visual axis toward the observer by a predetermined angle;
a holding member supporting said two display elements and said two free-form surface prisms, said holding member supporting each of said display elements substantially parallel to said tilted incidence surface of the corresponding free-form surface prism;
at least one electrical circuit board driving said two display elements; and
a cover having two portions for observing the lights of the video images from said free-form surface prisms, said cover covering said two display elements, said two light sources, said two free-form surface prisms, said holding member and said electrical circuit board, wherein
said electrical circuit board and said display elements are separated from each other but are electrically connected, and said electrical circuit board is disposed between said cover and said display elements or between said cover and said free-form surface prisms.

33. An apparatus according to claim 32, wherein said portions of said cover for observing the lights of video images are openings.

34. An image display apparatus comprising:
a display element displaying a video image;
a light source illuminating said display element;
a free-form surface prism guiding light of the video image from said display element, said free-form surface prism enlarging the video image on said display element and presenting the video image to an observer, said free-form surface prism having an incidence surface on which the light of the video image from said display element is incident;
an electrical circuit board driving said display element; and
a cover having a portion for observing the light of the video image from said free-form surface prism, said cover covering said display element, said light source, said free-form surface prism, and said electrical circuit board, wherein
said electrical circuit board and said display element are separated from each other but are electrically connected, and said electrical circuit board is disposed between said cover and said display element or between said cover and said free-form surface prism.

35. An image display apparatus comprising:
a display element displaying a video image;
a light source illuminating said display element;
a free-form surface prism guiding light of the video image from said display element, said free-form surface prism enlarging the video image on said display element and presenting the video image to an observer, said free-form surface prism having an incidence surface on which the light of the video image from said display element is incident;
an electrical circuit board driving said display element;
a cover having a portion for observing the light of the video image from said free-form surface prism, said cover covering said display element, said light source, said free-form surface prism, and said electrical circuit board; and
a flexible printed board through which said display element and said electrical circuit board are electrically connected, wherein
said electrical circuit board is disposed between said cover and said display element or between said cover and said free-form surface prism, and wherein said flexible printed board is so disposed as to have a configuration corresponding to an outside appearance of said free-form surface prism.

36. An image display apparatus comprising:
two display elements displaying video images corresponding to left and right eyes, respectively;
two light sources illuminating said two display elements, respectively;
two free-form surface prisms guiding light of video images from said two display elements to the left and right eyes, respectively, said free-form surface prisms enlarging the video images on said two display elements and presenting the video images to an observer, said two free-form surface prisms having incidence surfaces on which the light of the video images from the corresponding display elements are incident;
one or two electrical circuit boards driving said two display elements; and
a cover having two portions for observing the light of the video images from said free-form surface prisms, said cover covering said display elements, said light sources, said fee-form surface prisms and said electrical circuit board, wherein
said electrical circuit board and said display elements are separated from each other but are electrically connected, and said electrical circuit board is disposed between said cover and said display elements or between said cover and said free-form surface prisms.

37. A portable phone apparatus having an image display function, comprising:
a display element displaying a video image;
a light source illuminating said display element;
a free-form surface prism guiding light of the video image from said display element, said free-form surface prism enlarging the video image on said display element and presenting the video image to an observer, said free-form surface prism having an incidence surface on which the light of the video image from said display element is incident;
an electrical circuit board driving said display element; and
a cover having a portion for observing the light of the video image from said free-form surface prism, said cover covering said display element, said light source, said free-form surface prism, and said electrical circuit board, wherein
said electrical circuit board and said display element are separated from each other but are electrically connected, and said electrical circuit board is disposed between said cover and said display element or between said cover and said free-form surface prism.

38. A portable phone apparatus having an image display function comprising:
a display element displaying a video image;
a light source illuminating said display element;
a free-form surface prism guiding light of the video image from said display element, said free-form surface prism enlarging the video image on said display element and presenting the video image to an observer, said free-form surface prism having an incidence surface on which the light of the video image from said display element is incident;
an electrical circuit board driving said display element;
a cover having a portion for observing the light of the video image from said free-form surface prism, said cover covering said display element, said light source, said free-form surface prism, and said electrical circuit board; and
a flexible printed board through which said display element and said electrical circuit board are electrically connected, wherein
said electrical circuit board is disposed between said cover and said display element or between said cover and said free-form surface prism, and wherein said flexible printed board is so disposed so as to have a configuration corresponding to an outside appearance of said free-form surface prism.

39. A portable apparatus having an image display unit and a portable phone unit to which the image display unit is electrically connected and is mechanically attached, said portable apparatus comprising:
a display element displaying a video image;
a light source illuminating said display element;
a free-form surface prism guiding light of the video image from said display element, said free-form surface prism enlarging the video image on said display element and presenting the video image to an observer, said free-form surface prism having an incidence surface on which the light of the video image from said display element is incident;
an electrical circuit board driving said display element;
a cover having a portion for observing the light of the video image from said free-form surface prism, said cover covering said display element, said light source, said free-form surface prism, and said electrical circuit board; and
a flexible printed board through which said display element and said electrical circuit board are electrically connected, wherein
said electrical circuit board is disposed between said cover and said display element or between said cover and said free-form surface prism, and wherein said flexible printed board is so disposed so as to have a configuration corresponding to an outside appearance of said free-form surface prism.

40. An image display apparatus comprising:
a display element displaying an image;
a light source illuminating said display element;
a free-form surface prism guiding light of the image from said display element, said free-form surface prism enlarging the image on said display element and presenting the image to an observer, said free-form surface prism having an incidence surface on which the light of the image from said display element is incident;
an electrical circuit board driving said display element; and
a cover having a portion for observing the light of the image from said free-form surface prism, said cover covering said display element, said light source, said free-form surface prism, and said electrical circuit board, wherein
said electrical circuit board and said display element are separated from each other but are electrically connected, and said electrical circuit board is disposed between said cover and said free-form surface prism.

41. An apparatus according to claim 40, wherein said display element is disposed between said electrical circuit board and said free-form surface prism.

42. An apparatus according to claim 40, wherein said electrical circuit board is a flexible printed board.

43. An image display apparatus comprising:
a display element displaying an image;
a light source illuminating said display element;
a free-form surface prism guiding light of the image from said display element, said free-form surface prism enlarging the image on said display element and presenting the image to an observer, said free-form surface prism having an incidence surface on which the light of the image from said display element is incident;
an electrical circuit board driving said display element;
a cover having a portion for observing the light of the image from said free-form surface prism, said cover covering said display element, said light source, said free-form surface prism, and said electrical circuit board; and
a flexible printed board through which said display element and said electrical circuit board are electrically connected, wherein
said electrical circuit board is disposed between said cover and said free-form surface prism, and wherein said flexible printed board is so disposed as to have a configuration corresponding to an outside appearance of said free-form surface prism.

44. An apparatus according to claim 43, wherein said display element is disposed between said electrical circuit board and said free-form surface prism.

45. An image display apparatus comprising:
two display elements displaying images corresponding to left and right eyes, respectively;
two light sources illuminating said two display elements, respectively;
two free-form surface prisms guiding light of the images from said display elements to the left and right eyes, respectively, said free-form surface prisms enlarging the images on said display elements and presenting the images to an observer, said free-form surface prims having incidence surfaces on which the light of the images from the corresponding display elements are incident;
an electrical circuit board driving said display elements; and
a cover having two portions for observing the light of the images from said free-form surface prims, said cover covering said display element, said light sources, said free-form surface prisms, and said electrical circuit board, wherein
said electrical circuit board and said display elements are separated from each other but are electrically connected, and said electrical circuit board is disposed between said cover and said free-form surface prisms.

46. An apparatus according to claim 45, wherein said display element is disposed between said electrical circuit board and said free-form surface prisms.

47. An apparatus according to claim 45, wherein said electrical circuit board consists of a first electrical circuit board and a second electrical circuit board, and said first electrical circuit board is electrically connected to one of said display elements and said second electrical circuit board is electrically connected to the other of said display elements.

48. A portable phone apparatus having an image display function, comprising:
a display element displaying an image;
a light source illuminating said display element;
a free-form surface prism guiding light of the image from said display element, said free-form surface prism enlarging the image on said display element and presenting the image to an observer, said free-form surface prism having an incidence surface on which the light of the image from said display element is incident;
an electrical circuit board driving said display element; and
a cover having a portion for observing the light of the image from said free-form surface prism, said cover covering said display element, said light source, said free-form surface prism, and said electrical circuit board, wherein
said electrical circuit board and said display element are separated from each other but are electrically connected, and said electrical circuit board is disposed between said cover and said free-form surface prism.

49. An apparatus according to claim 48, wherein said display element is disposed between said electrical circuit board and said free-form surface prism.

50. A portable phone apparatus having an image display function, comprising:
a display element displaying an image;
a light source illuminating said display element;
a free-form surface prism guiding light of the image from said display element, said free-form surface prism enlarging the image on said display element and presenting the image to an observer, said free-form surface prism having an incidence surface on which the light of the image from said display element is incident;
an electrical circuit board driving said display element;
a cover having a portion for observing the light of the image from said free-form surface prism, said cover covering said display element, said light source, said free-form surface prism, and said electrical circuit board; and
a flexible printed board through which said display element and said electrical circuit board are electrically connected, wherein said electrical circuit board is disposed between said cover and said free-form surface prism, and wherein said flexible printed board is so disposed as to have a configuration corresponding to an outside appearance of said free-form surface prism.

51. An apparatus according to claim 50, wherein said display element is disposed between said electrical circuit board and said free-form surface prism.

52. A portable apparatus having an image display unit and a portable phone unit to which the image display unit is electrically connected and is mechanically attached, said portable apparatus comprising:

a display element displaying an image;

a light source illuminating said display element;

a free-form surface prism guiding light of the image from said display element, said free-form surface prism enlarging the image on said display element and presenting the image to an observer, said free-form surface prism having an incidence surface on which the light of the image from said display element is incident;

an electrical circuit board driving said display element;

a cover having a portion for observing the light of the image from said free-form surface prism, said cover covering said display element, said light source, said free-form surface prism, and said electrical circuit board; and a flexible printed board through which said display element and said electrical circuit board are electrically connected, wherein said electrical circuit board is disposed between said cover and said free-form surface prism, and wherein said flexible printed board is so disposed as to have a configuration corresponding to an outside appearance of said free-form surface prism.

53. An apparatus according to claim 52, wherein said display element is disposed between said electrical circuit board and said free-form surface prism.

* * * * *

UNITED STATES PATENT AND TRADEMARK OFFICE
CERTIFICATE OF CORRECTION

PATENT NO. : 6,515,638 B2
DATED : February 4, 2003
INVENTOR(S) : Tatsuo Chigira et al.

It is certified that error appears in the above-identified patent and that said Letters Patent is hereby corrected as shown below:

Column 4,
Line 34, "and." should read -- and --.
Line 42, "circuit" should read -- circuits --.

Column 5,
Line 17, "image.display" should read -- image display --.
Line 39, "10L" should read -- 110L --.

Column 17,
Line 48, "fee-form" should read -- free-form --.

Column 19,
Line 64, "prims" should read -- prism --.

Column 20,
Line 4, prims," should read -- prism, --.

Signed and Sealed this

Thirtieth Day of September, 2003

JAMES E. ROGAN
*Director of the United States Patent and Trademark Office*